(12) United States Patent
Heidasch (10) Patent No.: US 8,725,760 B2
(45) Date of Patent: May 13, 2014

(54) SEMANTIC TERMINOLOGY IMPORTER

(75) Inventor: Robert Heidasch, Speyer (DE)

(73) Assignee: SAP AG, Walldorf (DE)

( * ) Notice: Subject to any disclaimer, the term of this patent is extended or adjusted under 35 U.S.C. 154(b) by 9 days.

(21) Appl. No.: 13/149,036

(22) Filed: May 31, 2011

(65) Prior Publication Data

US 2012/0310969 A1 Dec. 6, 2012

(51) Int. Cl.
*G06F 17/30* (2006.01)

(52) U.S. Cl.
USPC .......................................................... 707/769

(58) Field of Classification Search
None
See application file for complete search history.

(56) References Cited

U.S. PATENT DOCUMENTS

| | | | |
|---|---|---|---|
| 4,661,924 A | 4/1987 | Okamoto et al. | |
| 5,995,920 A | 11/1999 | Carbonell et al. | |
| 6,163,785 A | 12/2000 | Carbonell et al. | |
| 6,519,586 B2 | 2/2003 | Anick et al. | |
| 7,051,023 B2 | 5/2006 | Kapur et al. | |
| 7,107,264 B2 * | 9/2006 | Lu ......................................... | 1/1 |
| 7,383,172 B1 | 6/2008 | Jamieson | |
| 7,580,831 B2 | 8/2009 | Haskell et al. | |
| 7,702,647 B2 | 4/2010 | Uceda-Sosa | |
| 7,774,404 B2 | 8/2010 | Heidasch | |
| 7,865,358 B2 * | 1/2011 | Green et al. ..................... | 704/10 |
| 7,958,074 B2 | 6/2011 | Uceda-Sosa | |
| 8,156,473 B2 | 4/2012 | Heidasch | |
| 8,205,120 B2 | 6/2012 | Heidasch et al. | |
| 8,239,839 B2 | 8/2012 | Rossmann et al. | |
| 8,335,314 B2 | 12/2012 | Heidasch | |
| 2003/0130976 A1 * | 7/2003 | Au .................................. | 706/55 |
| 2004/0044548 A1 | 3/2004 | Marshall et al. | |
| 2007/0156677 A1 | 7/2007 | Szabo | |
| 2007/0226242 A1 | 9/2007 | Wang et al. | |
| 2007/0255702 A1 | 11/2007 | Orme | |
| 2007/0277164 A1 | 11/2007 | Nandakumaraiah | |
| 2007/0294200 A1 * | 12/2007 | Au .................................. | 706/55 |
| 2008/0097748 A1 | 4/2008 | Haley et al. | |

(Continued)

FOREIGN PATENT DOCUMENTS

| | | |
|---|---|---|
| WO | 02/10980 | 2/2002 |
| WO | WO 2006/124952 | 11/2006 |

OTHER PUBLICATIONS

Ahu Sieg et al., "Web search personalization with ontological user profiles", Proceedings of the sixteenth ACM Conference on Conference on Information and Knowledge Management, CIKM '07, Jan. 1, 2007, pp. 525-534, XP050048869.
European Search Report for EP 12 00 4745, dated Mar. 28, 2013.

(Continued)

*Primary Examiner* — Rehana Perveen
*Assistant Examiner* — Hung Havan
(74) *Attorney, Agent, or Firm* — Kenyon & Kenyon LLP (57) ABSTRACT

A method, machine readable storage medium, and system for generating a semantic network that utilizes existing relationships between related terms in a searchable database. Upon detection of the absence of a searched term from a database, a term data structure and indexes in a particular domain in which related terms related to the results provided by the search engine may be analyzed to determine if a new term related to the unfound search term should be created. Upon creation of the term, attributes related to the term are generated so the term may be placed in the most proper domain, and linkages to other terms in the same or different domains may be generated. All of the information is stored in the database. User input is not needed to accomplish the creation of the new term in the database.

15 Claims, 3 Drawing Sheets

(56) References Cited

U.S. PATENT DOCUMENTS

| | | | |
|---|---|---|---|
| 2008/0147646 | A1 | 6/2008 | Jaschek et al. |
| 2008/0281810 | A1 | 11/2008 | Smyth et al. |
| 2008/0294982 | A1 | 11/2008 | Leung et al. |
| 2009/0019002 | A1 | 1/2009 | Boulis |
| 2009/0177463 | A1 | 7/2009 | Gallagher et al. |
| 2009/0216696 | A1 | 8/2009 | Downs et al. |
| 2009/0292700 | A1* | 11/2009 | Castellani et al. ............ 707/6 |
| 2010/0268702 | A1 | 10/2010 | Wissner et al. |
| 2010/0286979 | A1 | 11/2010 | Zangvil et al. |
| 2011/0022798 | A1* | 1/2011 | Hou et al. ............ 711/118 |
| 2011/0078205 | A1 | 3/2011 | Salkeld et al. |
| 2011/0225139 | A1 | 9/2011 | Wang et al. |
| 2011/0257963 | A1 | 10/2011 | Zuev et al. |

OTHER PUBLICATIONS

European Search Report for EP 12 00 3993, dated Jul. 23, 2012.

Sieg, Ahu, Bamshad Mobasher, and Robin Burke. "Web search personalization with ontological user profiles." Proceedings of the sixteenth ACM conference on Conference on information and knowledge management. ACM, Nov. 2007.

Satoshi Sekine et al., "Acquiring ontological knowledge from query logs," WWW 2007/Track: Data Mining, Jan. 1, 2007, XP055101168, pp. 1223-1224.

Office Action dated Feb. 21, 2014 issued in corresponding EP Application No. 12003993.8.

* cited by examiner

SEMANTIC TERMINOLOGY IMPORTER

RELATED APPLICATIONS

This application is related to commonly-assigned U.S. patent application Ser. Nos. 13/050,092 and 13/050,333, both filed on Mar. 17, 2011. The contents of both applications are incorporated herein by reference in their entirety.

BACKGROUND

Typically, the business knowledge and user terminology of an enterprise are distributed throughout an entire company, in the way the employees speak to one another, and in the many documents of the company.

Business software applications used by enterprises are built from business objects that group/encapsulate the definition of business terminology according to relevant content information (e.g. attributes defining business data which are described by underlying global data type) used by the application. For example, a defined business object, such as a material business object provides business-related terminology, such as the definition of the material (e.g., medium-density fiberboard in a home improvement company) and the material names (e.g., MDF) used/defined in a particular company. In addition, the acronym "MDF" may also refer to a product, such as a "metallic dual faucet." In this situation, there are different subject matter categories. In the particular instance, there is a product category, and sub-categories for wood products, (e.g., the medium density fiberboard), and plumbing products (e.g., the metallic dual faucet).

In addition, in large enterprises, a term may not have the same acronym from one division to the next, or, as above, the acronym may have an entirely different definition. Furthermore, an accounting department may have similar terms or acronyms as a sales department. A common problem is how to detect, and determine the business terminology being used within all divisions of the company, and how to consolidate it in a category-oriented data structure.

A challenge to accomplishing the indexing of data values is how to detect and determine the business terminology that is used in the everyday vernacular of the enterprise, and then consolidating the determined business terminology in respective categories. The consolidating of the business terminology into categories for a specific business may be developed manually by populating a database with the specific business terms and their definitions. However, such a manual approach is time consuming and costly.

An existing solution allows only the import of preconfigured semantic terminology, or the manual creation and/or adaption of information stored in a semantic network having domains, terms and term types.

DETAILED DESCRIPTION

The proposed solution uses the business terminology stored in business applications and exposed via business objects and search engine to build business terminology. The creation process is an automatic process that requires the import of an initial configuration which is typically provided by the business application provider (e.g. SAP).

Business data is typically organized in business objects, and is accessed by data connectors according to a data structure definition. The business objects as a source of data are used to define structure of searchable sources; this means, the BO elements are mapped to the search source elements. The particular elements of the search sources definition are assigned indirectly (via BO elements) to the global data types. Such defined search sources are user to build data indexes. A search engine simplifies accessing the business data by searching the data indexes. This is because each searchable data contains the back reference to the original business data. For example, an end-user calls the search engine to find required data, and then uses the search engine to open the original business data. Therefore, business objects, search source definitions and indexes of data values are ideal sources of terminology because they provide definitions of terms as well as term metadata.

A semantic network is a network that represents semantic relations among terms (e.g., concepts). The semantic network may be used as a form of knowledge representation, and therefore may be used to model business knowledge in companies and their various parts, e.g. as enterprise knowledge and/or terminology. The semantic network may be used with different techniques to identify the meaning of the term and/or sentence in a search request, but mainly the search terms are defined as words in some order or relation. The semantic network allows for creation of terms, i.e., phrases that are defined by types which characterize or specify the particular term. Although, a term may be assigned to different types. Additionally, the term may be used in different knowledge areas and may have a different (or slightly different) meaning for each area. The semantic network may be organized according to different knowledge areas, or knowledge domains. The semantic network may contain business information organized according to domain-grouped (knowledge domain) terminology and its relationships, which allows defining the meaning of particular terms (definition of terminology types) and related terms (e.g. synonyms, homonyms).

A knowledge domain, similar to a subject matter category, may be a data structure to group terms that belong to the same subject or expertise area, for example, information technology (IT), finance, etc. The expertise area may be grouped into subject matter categories, or knowledge domains, which may be used to specify the context of the required information and deliver data with better quality. Typically, the business knowledge and the terminology used is distributed through the whole company through the jargon used by company employees as well as in the many documents associated with the company. A problem in any enterprise is how to share among employees the currently used business terminology to simplify business communication, e.g. providing phrase or term suggestions in composing documents, like mail, documentations, marketing documents and flyers, etc., and how to update the terminology in a near-real time manner. Additionally, the same business knowledge (in the form of a business semantic network) may be reused in other business areas, e.g., searching for business information, documents or data.

Figure 1:
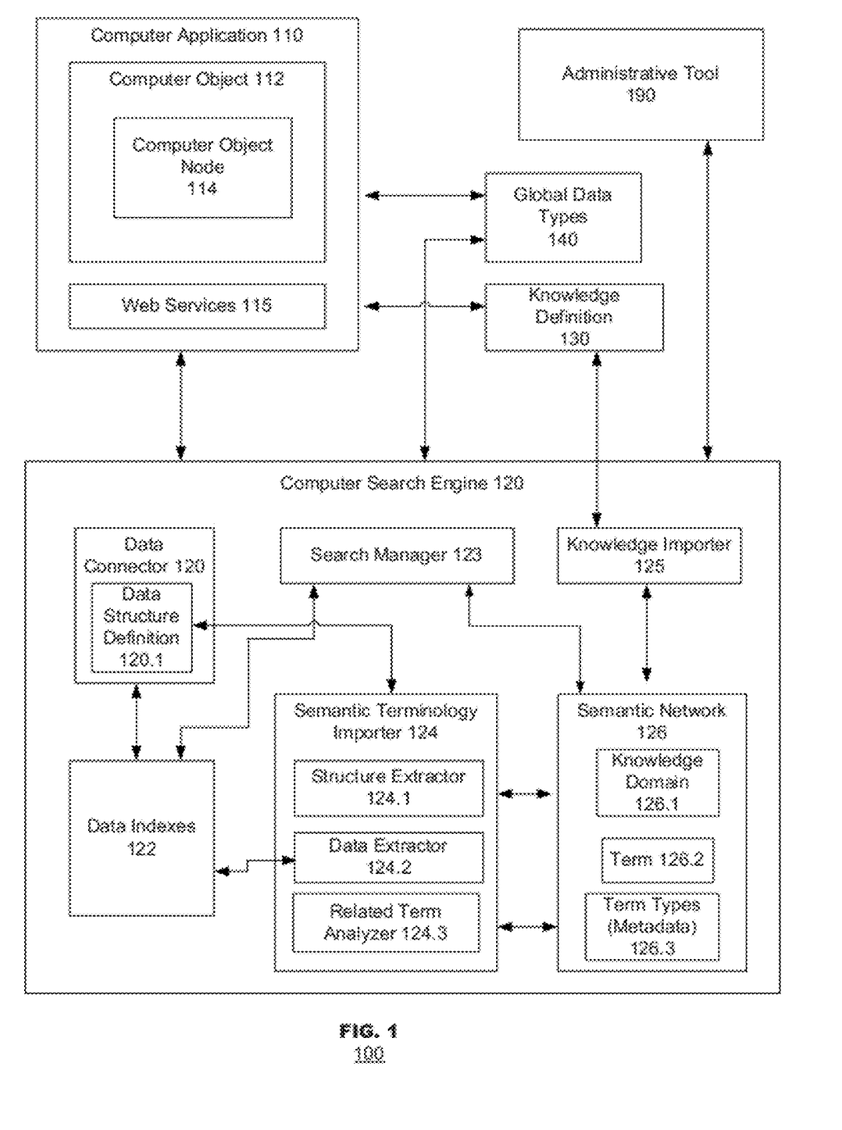
FIG. 1 illustrates a block diagram of a system for building the semantic network according to an embodiment of the present invention.

A common usage for relating business terminology may be in search engines, where the network may be searched using different techniques to identify the meaning of the term and/or sentence. Search terms may be defined as words in some order or relation. The searched term may then be interpreted by the search engine as a string/term. For example, the search result for "Lotus" may be divided into results about "Lotus" as a model of a car, "Lotus" as a brand of car oil, and "Lotus" as a flower. In this situation, there may be different knowledge domains, or information categories, in which the search results may be categorized. The "Lotus" example presents different elements that are used to create terms in a semantic network, for example, the term "Lotus" as a model of a car, "Lotus" as a brand of car oil could be provided by the material business object and the semantic terminology importer (see the structure extractor, 124.1) may map the BO attributes to the different term type. The computer application provider may provide the initial configuration of a mapping schema and the customer may adapt it to their current system configuration. This is because the meaning of the data may be defined in the customer system by a customizing definition, for example, as a domain specific language and the structure extractor can be adapted to the current customer setting. The third variant—"Lotus" as a flower can be, for example, defined by a separate business object or not imported if the customer is not interested in the "Lotus" as a flower definition. The customer may define in the semantic terminology importer 124.1 the scope of interest for particular search results; in other words, which means the business objects that are more relevant to the operation of the business enterprise are used to create relevant business terminology.

Embodiments provide a method for building a semantic network. The exemplary method may include accessing a search request definition. Data terms in a search request may be retrieved according to the search request definition. A data terms data structure may be accessed, and the processor may be determine if data terms in the search request already exist in knowledge domain data structures. Based on a determination that the data term in the search request does not exist in the domains, the processor may create terms using current domain, terminology and terminology types to create terms. Links may be generated from newly created terms to pre-existing terms that are related by terminology type in other domains. A terminology definition may be verified based on the newly created term.

Embodiments may also provide a machine readable storage medium embodied with computer instructions for causing a processor to execute a process for building a semantic network. The processor may access a search request definition. Data terms in a search request may be retrieved by the processor according to the search request definition. A data terms data structure may be accessed by the processor, and the processor may be determine if data terms in the search request already exist in knowledge domain data structures. Based on a determination that the data term in the search request does not exist in the domains, the processor may create terms using current domain, terminology and terminology types to create terms. The processor may, according to the program instructions, generate links from any newly created terms to pre-existing terms that are related by terminology type in other domains. A terminology definition may be verified based on the newly created term.

A system for building a semantic network may include a database, a user input-output device, and a processor. The database may store data related to an enterprise. A user input-output device may be coupled to the database. The processor may be responsive to inputs from the user input device and coupled to the database. The processor may further be configured to perform process steps to build the semantic network. The processor may access a search request definition. Data terms in a search request may be retrieved by the processor according to the search request definition. A data terms data structure may be accessed by the processor, and the processor may be determine if data terms in the search request already exist in knowledge domain data structures. Based on a determination that the data term in the search request does not exist in the domains, the processor may create terms using current domain, terminology and terminology types to create terms. The processor may generate links from any newly created terms to pre-existing terms that are related by terminology type in other domains. A terminology definition may be verified based on the newly created term.

An initial configuration may be provided by a computer application provider, or which may be generated by a user. Commonly, the initial configuration includes primarily a business object (BO) definition (BO elements) and global data type definitions (GDTs) in a data structure or hierarchical configuration of domains and terms types. Additionally, the computer application provider may provide the configuration of the search sources, its elements and default/initial mapping which is used by the semantic terminology importer to create custom-specific terminology. The software provider, e.g. SAP or other software provider, understands the business objects and its business logic, therefore may define the configuration to simplify import process at or by the customer system. This configuration may be used by the customer system without modifications, for example, the customer may use the "standard" configuration of the business object. If the customer has done some customizing modifications, for example, has slightly different definition/understanding of the particular BO elements that are then mapped to knowledge domains and/or term types), the customer may modify them before the customer starts the import actions. This data structure or hierarchical configuration of domains and term types may be used as a basis to build a custom-specific semantic network. The business objects may be used to build knowledge domains (or domains for short) in a business semantic network. The business object (BO) definition, can be used as a source of metadata (e.g. BO elements and the assigned global data types (GDT)) and as a source for terminology types (so-called term types) for construction of the knowledge domain. The terms may be collected and defined (e.g., as in a word list) to provide a common repository of terms used by various users. The term types may define the usage of the assigned terms that allows for classification of the terms. The term type is the term metadata. This means, the term type and metadata contains attributes that characterize the term, e.g. string, language, as a simple term or as a compound term, etc.

Embodiments provide a system including a semantic terminology importer, executing on a processor, for automatically generating a knowledge domain data structure based on business object data and structure of a business application. FIG. 1 illustrates a functional block diagram of a system utilizing a semantic terminology importer according to an embodiment of the present invention. The system 100 may include a computer application 110, a search engine 120, a knowledge definition database 130 and a global data type database 140.

The computer application 110 may include computer objects 112 (broader name of business object) and web services 115. The computer application 110 may be, for example, an invoicing application, and may interface with a user, for example, through a graphical user interface presented on a display device. Each of the computer objects 112 may comprise an object node structure 114 (broader name of business object structure). The object node structure 114 may include data elements, or attributes in metadata as well as sub-nodes. The object node structure 114 attributes may include an attribute name and an assigned global data type (GDT). Other data, for example, a local identifier, or statistics related to the object may also be included. The global data type attribute may be imported from the global data type database 140. In addition, the computer application 110 may exchange data with the knowledge definition 130. For example, the computer application 110 may be used by a user to update a product name, add a product, or term into the knowledge definition database 130 This may be done by the application provider when the initial knowledge definition is created. The initial knowledge definition may be imported as the initial configuration in customer system. An administrative tool 190 may be provided either externally or internally and allow an administrator user to administer the semantic knowledge (e.g., the terminology in semantic network).

The web services 115 of the computer application 110 may be computer object methods that respond to requests or executing processes of the computer application 110. For example, the computer application 110 may need data that is related to a process being executed and may submit a request via a particular web service 115 to the search engine 120. In response, the search engine 120 may send a request for particular data to the particular web service 115. In response to the received requests, the web services 115 may provide the appropriate object method to satisfy the request. The search engine may use this web service to obtain BO data from the computer application. The computer application provider may define a default web service and the customer, if necessary, may adapt/extend the new web service or provide a new web service, which may be dependent on customer requirements/application adaptations.

The search engine 120 may include data connector 120, data indexes 122, search manager 123, semantic terminology importer 124, knowledge importer 125 and semantic network 126. The search manager 123 may control the operation of the search engine 120, and be communicatively coupled with the computer application 110 via web services 115, the global data types 140 and the knowledge definition 130. The search manager 123 may exchange data with the data indexes 122 and semantic network 126. The data connector 120 may include data structure definition 120.1, which defines the structure of search sources and its elements and the data used by the particular enterprise. The global data types are used respectively in search sources and the search source's elements bases/maps on computer object elements because the definition of search sources and their respective elements bases/maps on computer object elements via the link between computer search engine 120 and global data types 140. The same global data types and search source elements and computer object elements are used in semantic terminology importer 124. The semantic network 126 may include data structures for the knowledge domain 126.1, terms 126.2 and the term types 126.3. The knowledge domain 126.1 may include a plurality of knowledge domains related to the data terms in terms 126.2 and term types 126.3. The knowledge domains 126.1 may be ordered hierarchically, which allows for knowledge grouping, for example, as in the "Lotus" example above, the first two meanings may belong to similar knowledge domains, and the last meaning may have nothing in common with the first two means, and may be defined in a completely different category/knowledge group (e.g., as a flower). The structure of the plurality of knowledge domains in knowledge domain 126.1 may be configured to include links (e.g., addresses or pointers) to related terms and/or term types in terms 126.2 and term types 126.3. The semantic network 126 once built may be continuously updated. Each of the knowledge domain 126.1, terms 126.2 and the term types 126.3 data structures may be updated based on data imported to the search engine 120 by the knowledge importer 125 as well as by the semantic terminology importer 124.

The semantic terminology importer 124 may include a structure extractor module 124.1, a data extractor module 124.2 and a related term analyzer 124.3. The structure extractor module 124.1 may contain the default meaning of the business objects, its elements, and search sources and its elements. Additionally, the structure extractor module 124.1 may contain mapping/modeling of data transfer conditions between source data structures (business objects, its elements, and search sources and its elements) and its destinations; therefore the structure extractor module may access the data structures of the semantic network 126. For example, the structure extractor 124.1 may access one or all of knowledge domain 126.1, term 126.2 and term types 126.3. The term types 126.3 may include metadata related to term and the knowledge domain as well as additional information related to the term type. Data in the term 126.2 may include domain identifiers, term identifiers, and its relations. Similarly, term types in types 126.3 may include type identifiers, and its metadata that describes particular type (similar to element type and its description—global data type). Meanwhile, the data extractor 124.2 may extract data from both the semantic network 126 and the data indexes 122. After processing the extracted data according to the extracted structure, the processed data may be incorporated into the semantic network 126.

Figure 2:
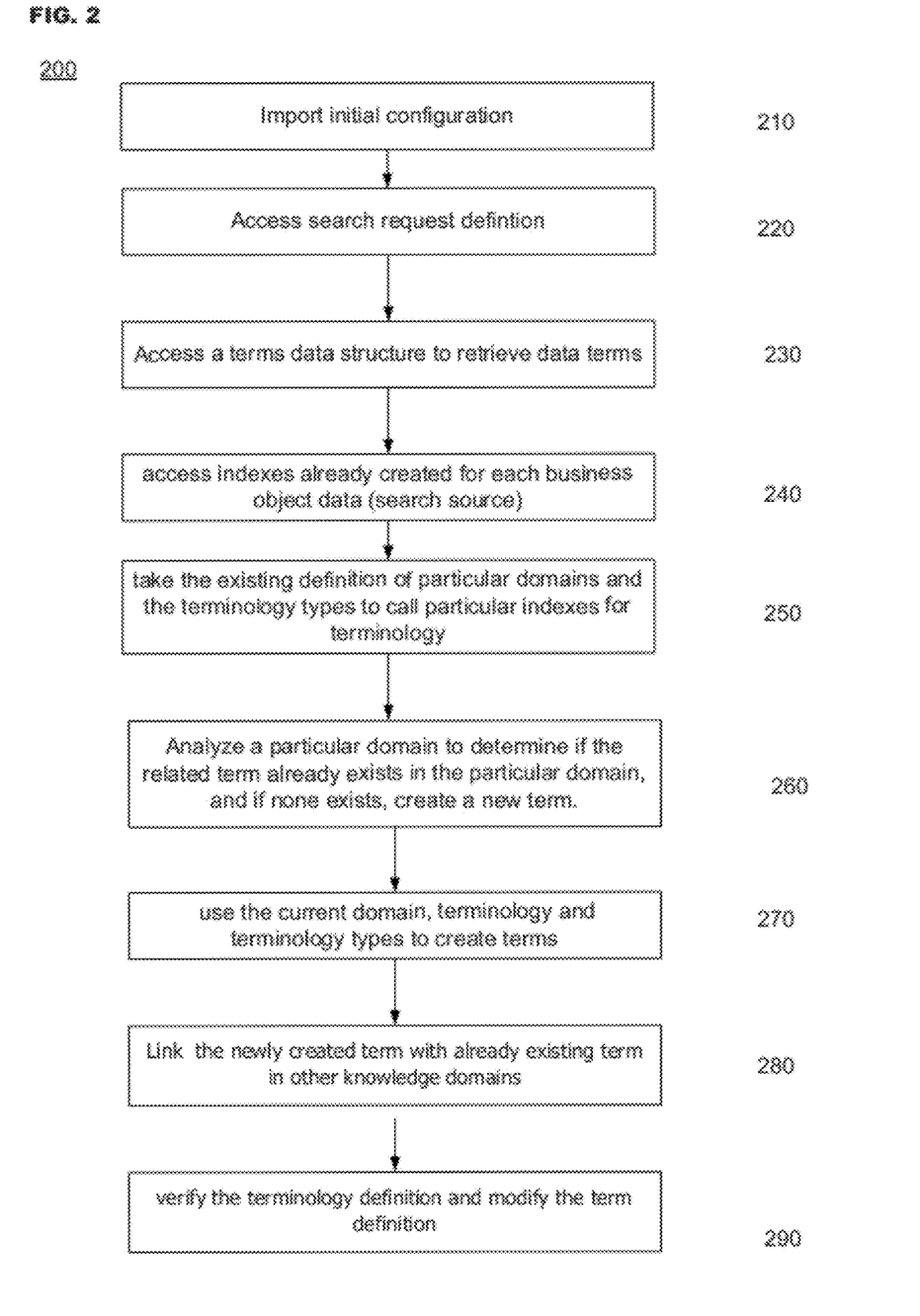
FIG. 2 illustrates an exemplary method for building the semantic network according to an embodiment of the present invention.

FIG. 2 illustrates an exemplary method for building the semantic network according to an embodiment of the present invention. A computer processor may be configured to execute program instructions to perform the method 200. In step 210, an initial configuration provided by the application provider may be imported into the semantic network (as an initial set of domains, terms and term types), and relationship mapping between source structures (business computer objects, the business computer object's elements, and search sources and the search source's elements) and target elements and respective assignment/link conditions (simple assignment and/or relation model) may occur. As mentioned above, the initial configuration may contain business object definitions and global data type definitions. After a search request is entered by a user for a particular term, the semantic terminology importer 124 via a structure extractor 124.1, for example, using data from the initial configuration and/or data configured/modified by the customer (e.g., a customer-related adoption that reflect customer-specific deviations from the standard application configuration/customizing) may, at step 220, access the search request definition. The search request definition (which may include objects defined on the search sources using elements which defines the access to the particular indexes—search source specific interface defined to support attributed search in business objects) may, for example, define which business data may be accessed by the semantic terminology importer 124, and may incorporate data objects from the initial configuration imported in step 210. The data extractor 124.2 may, at step 230, access the terms data structure 126.2 to extract, for example, business application data—terminology. During the accessing of the search request definition and the terms data structure, the search engine 125 may also access, at step 240, indexes already created (either in the initial configuration, by the semantic terminology importer 124, or by a user) for each business/computer object data (search source) and may provide the access by using, for example, an object request. In other words, the search engine may use the indexes that the search engine provides as the best hits (result containing business information) for particular requests. Because the indexes are built from the search source definition (which are created from the computer object/business object definition), the semantic terminology importer 124 may access the data indexes directly (data containing in the indexes) and map data/transfer data directly from index to semantic network, thereby creating, or updating, terms, domains and term types. Therefore, the data extractor 124.2 does not have to call the search requests every time it obtains data.

Also, in step 240, the data extractor 124.2 may access the same indexed business information via defined request attributes. The defined request attributes may include, for example, an attribute identifier (ID), name of the attribute in business objects, attribute type and length, and a description. The name of the attribute in a business object may be an identifier that allows assignment of the business object definition element, which can be used by the semantic terminology importer 124 in the assignment/mapping conditions and furthermore its global data type which may extend the definition of the term types.

Using this information, the semantic terminology importer 124 may, at step 250, take an existing definition of particular domains in knowledge domain 126.1 and the terminology types from term types 126.3 to call for terminology, which may be stored in particular indexes within term 126.2. For example, if the semantic terminology importer 124 is tasked to fill the material domain with values of material data types, the indexes containing material data may be called via respective search request attributes to obtain existing terms in a customer system. The same may happen in other domains for appropriate business object data according to the search request.

Each result provided by the search engine may contain a search term and related terms in a result object that are used by the related term analyzer 124.3. The related term analyzer 124.3 is then accessed by or linked to data extractor 124.2 to enrich existing terminology. The search engine can be configured to provide a certain number of related terms in each result. This means the related term analyzer 124.3 may analyze a particular domain according to a domain identifier within knowledge domain 126.1 to determine if the related term already exists in the particular domain, and if none exists, a new term is created (Step 260). By this process, the most often used terms in the result object (at least in this particular customer business application) may be automatically detected. The most often used terms may be stored as additional terms in a particular knowledge domain 126.1 of the semantic network 126.

The semantic terminology importer 124 can be additionally configured to support the extraction of grouped attribute values, for example, attributes that are provided by a business computer object in separate elements but which belong together, for example, a company name and its abbreviations, amount and unit, data and date format, time and time zone, and the like. The business object provider may group any number of defined attributes together and therefore reflect its specific meaning. For example, the customer may configure some attributes or group of attributes that defines the assignment of the business data (terms) to different terminology types. The typical example could be some attribute that defines different types of material, in which case the attributes may be assigned to different term types (reflection of material classification).

When a term is not found in any particular domain at step 260, the semantic terminology importer 124, at step 270, may use the current domain identifier, terminology and terminology type identifiers to create terms. New terms may be created by calling a method of the semantic network (that operates like a SQL command) to create/update terms, domains and term types. Data access request (direct access to data index does not require building of search call) may be created using the initially imported semantic terms from the initial configuration, for example, and the subsequent access requests may be generated using newly imported/created terminology. This functionality may use defined "stopping" conditions that an administrator may define as how many new values must be retriever before an import process in particular domain stops providing search results.

Such created terms in a knowledge domain (identified by domain ID and term ID which describes a unique meaning of the term in particular knowledge domain) may be linked with already existing terms in other knowledge domains at step 280. In other words, the terms may be linked with other terms defined in other business objects. The terminology extractor uses the business object definition to build links between the terms.

Additionally, a terminology administrator, for example, a person that may be responsible for administering the semantic knowledge (e.g., the terminology in semantic network) can verify the terminology definition and modify the term definition (e.g. add related terms) at step 290. The terminology administrator can be used as a convenient tool to build links, e.g. usage of external terminology definition (e.g. third-party definition—lexicons) to propose related terms. Otherwise, links may be created automatically by referencing metadata connections in the data indexes (e.g., 122), knowledge domain (e.g., 126.1), term data structure (e.g., 126.2), and term type metadata (e.g., 126.3) by the semantic terminology importer 124. Alternatively, links may be formed either by both the administrator and the semantic terminology importer 124.

The building of the semantic knowledge, e.g. structuring and entering of the terminology and its organization (assignment to domains and term types) in each company is time consuming (high cost of implementation) and very often error prone (many terms, domains, term types). Therefore, the process simplification—defining of automatic process that supports the terminology creation brings a huge savings in the implementation phase of the semantic-based solutions (e.g. Semantic Business Applications and its usage in other business applications—ERP, CRM, SCM, etc.)

The above-described exemplary solution supports automatic creation for each business object; this means business application provider (e.g. SAP) provides initial configuration—domains mapped to BO definition and term types defined from BO element definition and the whole content—terms used by customer are then automatically created from content stored in business application and available via search results. In addition, embodiments use the business terminology (e.g. material, products, customers, etc.) stored in business applications and exposed via business objects to the search engine. The terminology may be, in an automatic way, obtained and used to create terms in a semantic network.

The building of the semantic knowledge, e.g. structuring and entering of the terminology and its organization (assignment to domains and term types) in each company is time consuming (a high cost of implementation) and very often error prone (many terms, domains, term types). Therefore, the process simplification—defining of automatic process that supports the terminology creation brings a huge savings in the implementation phase of the semantic-based solutions (e.g. Semantic Business Applications and its usage in other business applications—ERP, CRM, SCM, etc.). And finally, the solution allows a better understanding of business terminology used in particular company and defined/used by business experts and its sharing is very critical part of the daily job.

Figure 3:
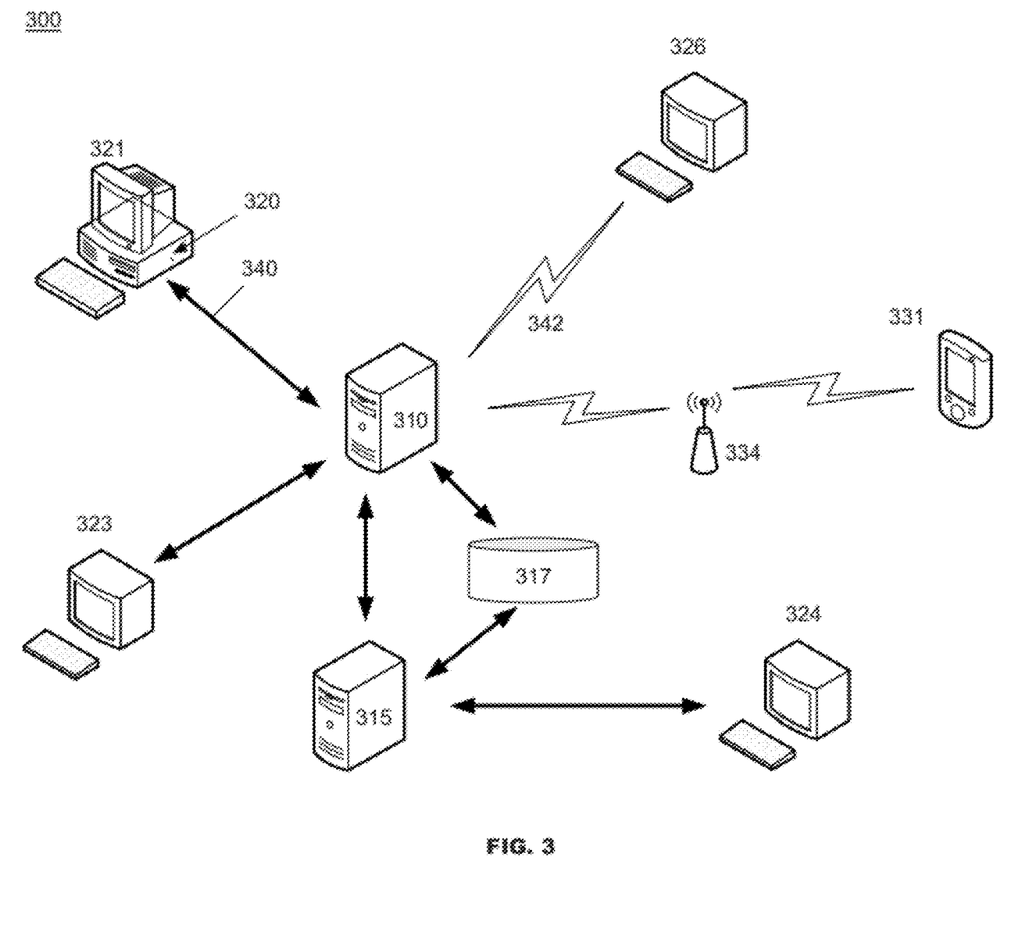
FIG. 3 illustrates an exemplary hardware configuration for implementing a system according to an embodiment of the present invention.

FIG. 3 illustrates an exemplary hardware configuration for implementing a system according to an embodiment of the present invention. The system 300 may comprise one or more networked servers 310 and 315, one or more client terminals 321, 323, 324 and 326, data storage devices 317, wired and wireless communication links 340, 342, wireless access point 334, and a portable device(s) 331. The one or more networked servers 310 and 315 may execute a multi-application software system. The servers 310, 315 may include processor(s), internal memory and related computer program instructions (all not shown).

The server 310 and/or 315 may execute on a processor a search engine program (as described with respect to FIG. 1) that facilitates generation of a semantic network including data transfers between the networked servers 310 and 315, and the client terminals 321, 323, 324 and 326, and/or portable device(s) 331 over wired or wireless communication paths. The server 310 may access data storage device(s) 317 that store machine-readable software instructions that may be accessed and executed by the processor(s) of the server 310.

The data storage device(s) 317 also may store data related to the operation of an enterprise including generated by the search engine and the semantic network interpreter. The data storage device 317 that may be a hard disk drive, non-volatile memory, flash memory, or any suitable device for storing electronic data, and may be organized as a object-oriented or relational database. The data storage may maintain hierarchical data structures containing information related to a variety of different business functions of an enterprise. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The servers 310 and 315 may communicate with client terminal(s) 321, 323, 324, 326 and portable device(s) 331 via network connections 340 and 342. The client terminals 321, 323, 324, 326 may include a processor, display device, and data storage device, such as a hard disk (all not shown). The client terminals 321, 323, 324, 326 may participate in execution of program instructions. The portable device 331 may be a smartphone, personal digital assistant, tablet, notebook or mini-notebook computer capable of wired and/or wireless communication. The portable device 331 may include memory, a processor, input device, display, and devices that enable wired or wireless communication.

The number of servers, number of clients and topology of the network connections between them are immaterial to the present discussion unless otherwise noted. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium may include electronic circuits, semiconductor memory device, ROM, flash memory, erasable ROM (EROM), floppy diskette, CD-ROM, optical disk, hard disk, fiber optic medium, any electromagnetic storage device, or optical. The code segments may be downloaded via computer networks such as Internet, Intranet, etc. The disclosed embodiments may be used in a semantic business application solution to support context-related search in SAP business applications (e.g. SAP ERP, SAP CRM, etc.) and/or non-SAP systems. The business knowledge provided by a semantic network can be used by all business applications, e.g. as a semantic extension.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

I claim:

1. A method for building a semantic network, comprising:
   accessing, by a processor, a search request definition, based on a search request, within one of a plurality of knowledge domains, each of said knowledge domains representing a different subject matter category;
   retrieving data terms in the search request according to the search request definition;
   accessing a data terms data structure within the knowledge domain;
   determining, by the processor, if data terms in the search request already exist in the knowledge domain data structure;
   based on a determination that data terms in the search request do not exist in the knowledge domain data structure:
      displaying a results object of related data terms in other knowledge domains, wherein the related terms are categorized by knowledge domain;
      using current domain, terminology and terminology types to create terms for the data terms in the search requests based on at least one related term in other knowledge domains;
   generating associations, by the processor, from newly created terms to pre-existing terms in other knowledge domains that are related by terminology type so that the newly created terms and the pre-existing terms are displayed together in a subsequent results object; and verifying terminology definition based on the newly created term.

2. The method of claim 1, further comprising:
modifying terminology definition based on the newly created term.

3. The method of claim 1, wherein accessing a data terms data structure comprises:
following a mapping of data transfer conditions between source data structures and the condition's destinations.

4. The method of claim 3, wherein the data transfer conditions include at least one of business computer objects, business computer object elements, search sources and search sources elements.

5. The method of claim 3, further comprising:
using an existing definition of particular domains and the terminology types to call particular indexes for terminology.

6. A non-transitory machine readable storage medium embodied with computer instructions for causing a processor to execute a process for building a semantic network, the method comprising:
accessing a search request definition, based on a search request, within one of a plurality of knowledge domains, each of said knowledge domains representing a different subject matter category;
retrieving data terms in the search request according to search request definition;
accessing a data terms data structure within the knowledge domain;
determining if data terms in the search request already exist in the knowledge domain data structure;
based on a determination that data terms in the search request do not exist in the knowledge domain data structure:
displaying a results object of related data terms in other knowledge domains, wherein the related terms are categorized by knowledge domain
using current domain, terminology and terminology types to create terms for the data terms in the search request based on at least one related term in the other knowledge domains;
generating associations links from newly created terms to pre-existing terms in other knowledge domains that are related by terminology type so that the newly created terms and the ore-existing terms are displayed together in a subsequent results object; and
verifying terminology definition based on the newly created term.

7. The non-transitory machine readable storage medium of claim 6, further comprising:
modifying terminology definition based on the newly created term.

8. The non-transitory machine readable storage medium of claim 6, wherein accessing a data terms data structure comprises:
following a mapping of data transfer conditions between source data structures and the condition's destinations.

9. The non-transitory machine readable storage medium of claim 8, wherein the data transfer conditions include at least one of business computer objects, business computer object elements, search sources and search sources elements.

10. The non-transitory machine readable storage medium of claim 6, further comprising:
using an existing definition of particular domains and the terminology types to call particular indexes for terminology.

11. A system for building a semantic network, the system comprising:
a database for storing data related to an enterprise;
a user input-output device coupled to the database;
a processor responsive to inputs from the user input device and coupled to the database, the processor configured to:
accessing a search request definition, based on a search request, within one of a plurality of knowledge domains, each of said knowledge domains representing a different subject matter category;
retrieving data terms in the search request according to search request definition;
accessing a data terms data structure within the knowledge domain;
determining if data terms in the search request already exist in the knowledge domain data structure;
based on a determination that data terms in the search request do not exist in the knowledge domain data structure:
displaying a results object of related data terms in other knowledge domains, wherein the related terms are categorized by knowledge domain
using current domain, terminology and terminology types to create terms for the data terms in the search request based on at least one related term in the other knowledge domains;
generating associations from newly created terms to pre-existing terms in other knowledge domains that are related by terminology type so that the newly created terms and the pre-existing terms are displayed together in a subsequent results object; and
verifying terminology definition based on the newly created term.

12. The system of claim 11, the processor further configured to:
modify terminology definition based on the newly created term.

13. The system of claim 11, wherein accessing a data terms data structure comprises:
following a mapping of data transfer conditions between source data structures and the condition's destinations.

14. The system of claim 13, wherein the data transfer conditions include at least one of business computer objects, business computer object elements, search sources and search sources elements.

15. The system of claim 11, further comprising:
using an existing definition of particular domains and the terminology types to call particular indexes for terminology.

* * * * *